A. GEYER & J. G. FITZPATRICK.
GEAR WHEEL.
APPLICATION FILED JULY 15, 1915.

1,180,639.

Patented Apr. 25, 1916.
2 SHEETS—SHEET 1.

WITNESSES

INVENTORS

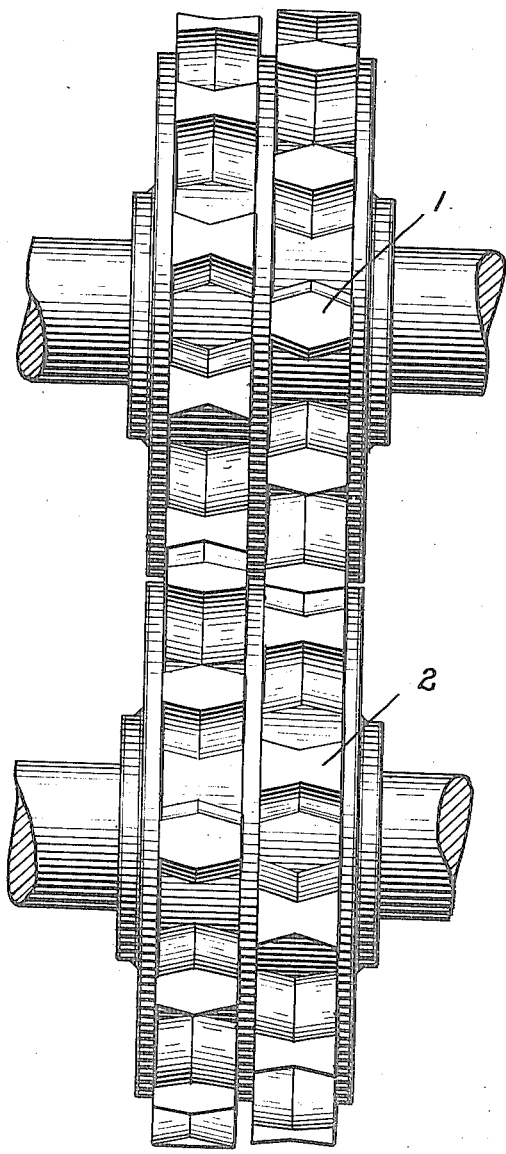
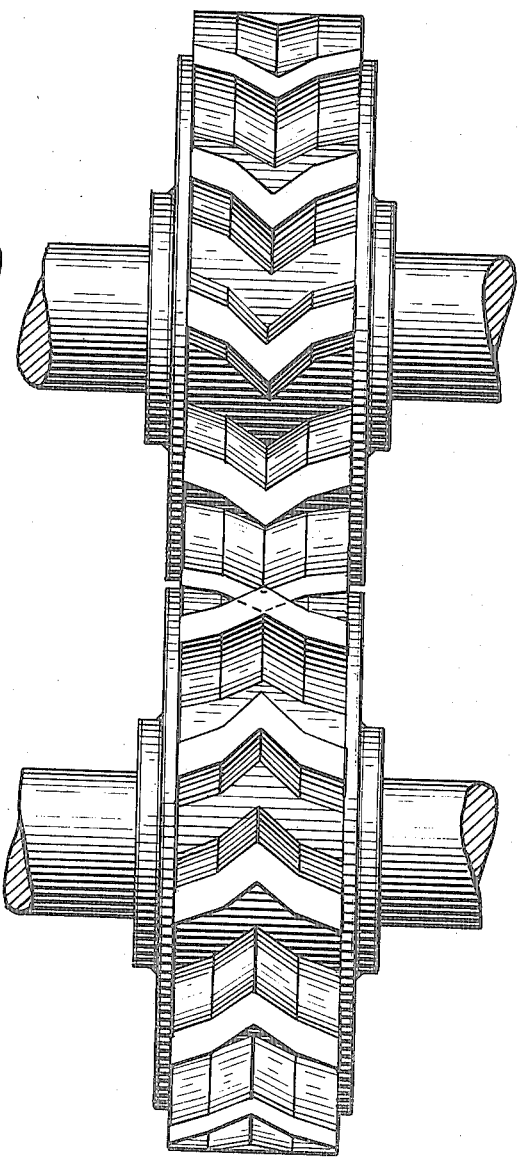

UNITED STATES PATENT OFFICE.

AUGUST GEYER, OF CARRICK, AND JOHN G. FITZPATRICK, OF PITTSBURGH, PENNSYLVANIA.

GEAR-WHEEL.

1,180,639.   Specification of Letters Patent.   Patented Apr. 25, 1916.

Application filed July 15, 1915. Serial No. 40,094.

*To all whom it may concern:*

Be it known that we, AUGUST GEYER, residing at Carrick, in the county of Allegheny and State of Pennsylvania, and JOHN G. FITZPATRICK, residing at Pittsburgh, in the county of Allegheny and State of Pennsylvania, both citizens of the United States, have invented or discovered certain new and useful Improvements in Gear-Wheels, of which improvements the following is a specification.

Our invention relates to improvements in gear-wheels.

While not limited to any specific application, our invention may advantageously be applied to the gear-wheels which drive the rolls of rolling mills.

The utility of the invention lies in the matters of strength and durability.

The invention is illustrated in the accompanying drawings.

Figure 1:
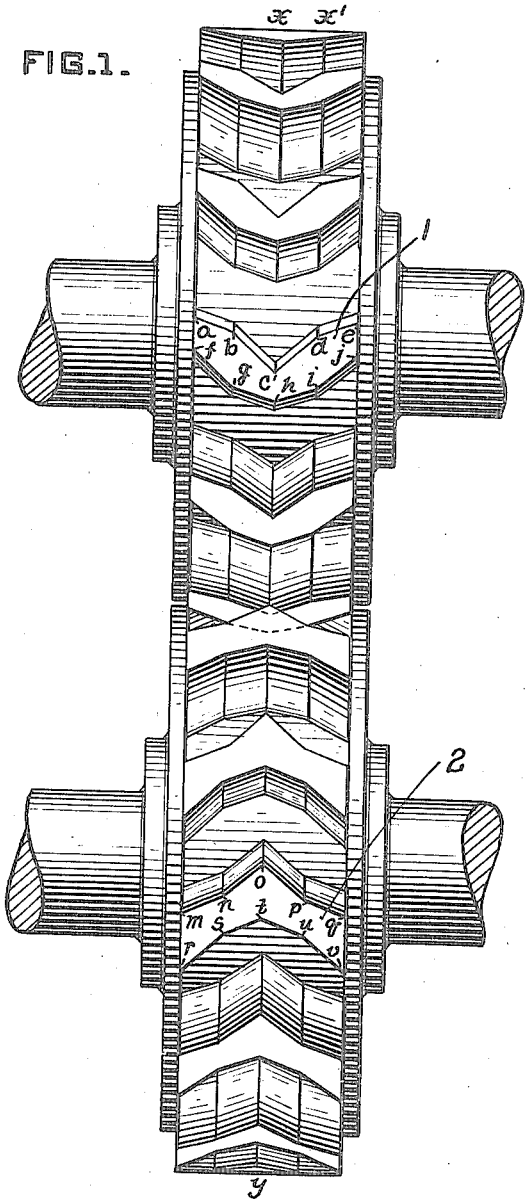
Figure 2:
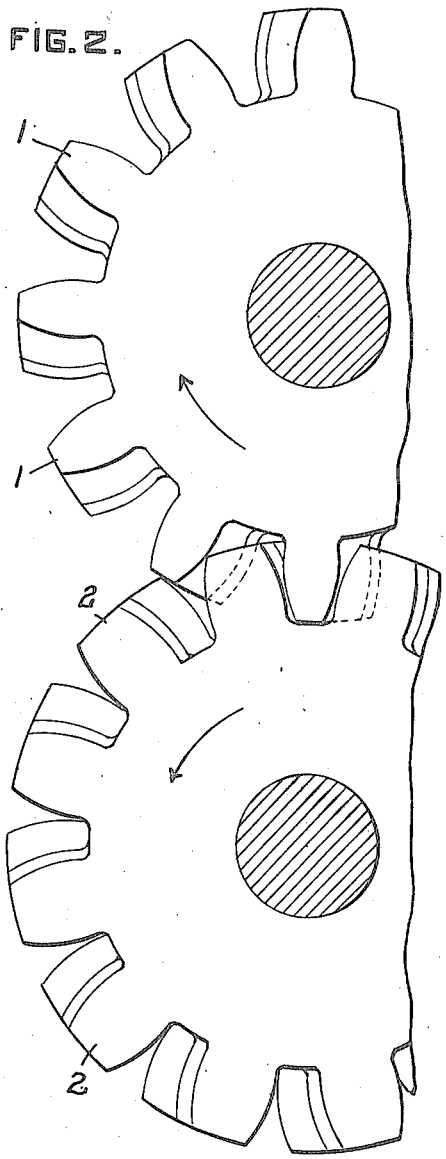
Figure 3:
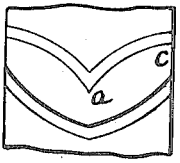
Figure 4:
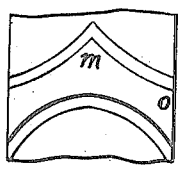

Figures 1 and 2 show in front and side elevation a pair of gear-wheels which embody the invention; Figs. 3 and 4 are fragmentary views in front elevation, showing a modification in the shape of the teeth; Figs. 5 and 6 are views similar to Fig. 1, showing additional modifications.

Referring first to Figs. 1 and 2, it will be observed of the gear wheels there shown that the teeth with which they are provided are essentially of herring-bone type; but that the faces of the individual teeth do not extend in straight lines from center to side, but in broken lines. The coacting faces of the teeth of the wheels are bowed forward in the direction of turning in the broken line $a$—$b$—$c$, on one wheel and in the broken line $m$—$n$—$o$ on the other. (The direction of turning is indicated in Fig. 2 by arrows.)

The advantage of the herring-bone gear over the spur gear is that the engagement of succeeding pairs of teeth, instead of being discrete and abrupt, with a consequent hammering or jerking effect, is progressive and overlapping and gradual, with a consequent smoothness in operation. The disadvantage of the herring-bone gear is that the strains of service are concentrated and intensified upon the ends of the teeth; the faces of the teeth wear away more rapidly at the ends than elsewhere; and, after relatively short service, the herring-bone gear has lost to a considerable degree that feature which was its distinctive merit.

Our improved gear possesses the characteristic feature of the herring-bone gear: the engagement of succeeding pairs of teeth is progressive and overlapping. And, at the same time, the stress which in the typical herring-bone is concentrated at the ends of the teeth, is more rapidly distributed, and in consequence the difficulty indicated above is diminished and overcome.

In the rotation of the gears of Figs. 1 and 2, the direction of rotation is that indicated by arrows (Fig. 2); the upper is a drive wheel and the lower the driven.

The face of each tooth of the drive wheel is such as is indicated on the tooth marked 1 by the broken line $a$—$b$—$c$—$d$—$e$; and the face of each tooth of the driven wheel is that indicated on tooth 2 in the broken line $m$—$n$—$o$—$p$—$q$. Engagement begins at the outer margins of the wheels, the points $a$ and $e$ of the tooth of the drive wheel engaging the points $m$ and $q$ of the tooth of the driven wheel. If this were the ordinary herring-bone construction, the face of the tooth of the drive wheel would extend in straight lines from the points $a$ and $e$ to the middle $c$, and the face of the corresponding tooth of the driven wheel would extend in straight lines from the points $m$ and $q$ to the middle $o$; the contact between the faces, beginning at the points $a$, $m$ and $e$, $q$, would, as the gears turn, immediately become lines of contact, and these lines of contact would progress, and lengthen as they progressed, inward toward the middle of the tooth and downward toward its base. By making the faces of the teeth from margin to middle on broken lines such as $a$—$b$—$c$ ($m$—$n$—$o$) and $c$—$d$—$e$ ($o$—$p$—$q$), instead of on straight lines, and by making the portions of the faces which come first into contact ($a$—$b$ which contacts with $p$—$q$) oblique in greater degree to the pitch of the wheel and more nearly transverse to the face of the wheel than the face of the ordinary herring-bone tooth (extending in straight line from $a$ to $c$, $m$ to $o$, etc.) would be, while contact begins (as in the case of ordinary herring-bone gear) at the points and advances in lines of contact which lengthen as they advance, yet, in consequence of the angular disposition of the faces as compared with the angular disposition of the faces of the ordinary herring-bone gear of equal over-all dimensions, the lines of contact lengthen more rapidly (the speed of rotation being assumed to be constant) and, in consequence of such more rapid and greater extension of the contact lines, the strains of service (otherwise unduly and excessively concentrated) are distributed and the consequent excessive wear upon the ends of the teeth is diminished. This benefit and advantage is gained without losing or diminishing the advantage inherent in the herring-bone construction. As compared with gears of ordinary herring-bone type, whose faces would be indicated by straight lines $a$—$c$, $c$—$e$, $m$—$o$, and $o$—$q$, the gears shown have equal efficacy, so far as concerns the overlapping of the periods of engagement of successive pairs of teeth, and at the same time the rate of deterioration is diminished. Thus the herring-bone gear is improved and made durable and effective through longer periods of service.

It remains to remark that the gain described, accomplished by turning a portion of the face of the tooth $a$—$b$ to a greater degree of obliquity than that of the ordinary tooth (which would be on the line $a$—$c$), is not counteracted, nullified nor lost because the portion $b$—$c$ of the face of the tooth is turned to a gentler degree of obliquity. This is because the strains on the forward and marginal portions of the faces of the teeth are far greater than on the rearward and medial portions. The diminished obliquity of the portion of the tooth $b$—$c$ ($n$—$o$), therefore, although it does effect a more rapid diminution of the length of the line of contact as pairs of teeth in engagement approach the point of separation, does not result in an increased wear such as to counteract the benefit described above, because the strains in that portion of the structure are not so great.

In Figs. 1 and 2 we have shown the faces of the teeth of the gears bowed in broken lines ($a$—$b$—$c$ and $m$—$n$—$o$); in Figs. 3 and 4 we show that these faces may be bowed on curves $a$—$c$ and $m$—$o$, and with manifestly the same beneficial advantageous result.

Another feature of our invention remains to be described. The tooth 1 of the upper wheel of the pair shown in Fig. 1 is bowed outward or made convex not only on its forward face, to the purpose and end already described, but in like manner it is bowed outward on its rear face, as is indicated by the broken line $f$—$g$—$h$—$i$—$j$. In like manner the tooth of the lower wheel is concave both on its forward face $m$—$n$—$o$—$p$—$q$ and on its rear face $r$—$s$—$t$—$u$—$v$. In plan, the tooth of the upper gear is rhomboidal and the tooth of the lower gear is medially reduced in thickness. This shaping of the individual teeth affords greater strength than if the teeth were of uniform thickness throughout. This will readily be understood when consideration is given to the fact that the strength of a gear tooth is largely dependent upon its moment of resistance to bending. In the tooth 1, the moment of inertia about the neutral axis of any transverse section will be greater than the moment of inertia of a section of the same length, having the same area, but whose opposite faces are parallel. The same considerations apply to the tooth 2. And hence it follows that, when constructed upon the same data, the teeth which we provide are stronger than teeth whose faces are not relatively bowed.

It remains only to be noted of Figs. 5 and 6, that the teeth of the gears shown in Fig. 5 possess the second of the two features of our invention now described but not the first, while the teeth of the gears of Fig. 6 possess the first feature but not the second. That is to say, the gears of Fig. 5 are essentially spur gears, possessing that discrete engagement of successive pairs of teeth which is characteristic of spur gears, but the individual teeth, being in plan oppositely convex and oppositely concave (compare in this respect teeth 1 and 2), are stronger to endure the strains of service than teeth of equal width and equal cross-sectional area and of uniform thickness.

In Fig. 6 the gears are of the herring-bone type. The teeth have the bowed faces and by virtue of that fact possess our invention, so far as concerns the feature first described above; but the individual teeth are of uniform thickness throughout, and accordingly have not the greater strength which may be gained, as described above, by adopting for the individual teeth opposite convex and opposite concave faces.

It is also to be remarked of the gears of Fig. 6 that the direction of rotation is the same as indicated in Figs. 1 and 2; and, further, while in the case of Fig. 1 the upper is the drive and the lower the driven wheel, in the case of Fig. 6 either wheel may be the drive and the other the driven wheel.

In the ensuing claims we speak of the angle of the obliquity of the face of the tooth to the pitch of the wheel. Referring to Fig. 1, the line $x$—$y$ is the pitch line of the gear wheels there shown; and it is to be observed that the angle of the obliquity of the medial portion of tooth 1, that is the angle $d\ c\ x$ is not so great as that of the marginal portion, that is the angle $e\ d\ x'$.

We claim as our invention:

1. A gear wheel provided with a tooth whose operative face is oblique to the pitch line, the angle of obliquity being greater in the marginal portion of the face of the tooth than in the medial portion.

2. A gear wheel provided with a tooth whose operative face is inclined rearwardly with respect to the direction of turning, from margin toward its medial portion, the angle of inclination being greater at the margin than at the middle portion of the wheel.

3. A gear wheel provided with teeth which extend obliquely and in opposite directions from opposite margins of the wheel toward its middle portion, the teeth being of equal thickness at the margins and at the middle portion and of another thickness at an intermediate point.

4. A gear wheel provided with a tooth which is inclined on the face of the wheel rearwardly with respect to the direction of turning, from the margin of the face of the wheel toward its medial portion, the operative face of said tooth at the margin of the face of the wheel being inclined to the pitch line of the wheel at a greater angle than at the middle portion, and the opposite face of said tooth being inclined to the pitch line at a smaller angle at the margin of the wheel than at the middle portion.

5. A pair of gear wheels in which the teeth extend obliquely, the teeth of one wheel being oppositely convex and the teeth of the other oppositely concave.

6. A pair of gear wheels in which the individual teeth are correspondingly of increased and of diminished thickness inward from the ends.

7. A herringbone gear wheel in which the thickness of the individual tooth varies, increasing from the medial line of the wheel and from the margin to an intermediate point.

In testimony whereof we have hereunto set our hands.

AUGUST GEYER.
JOHN G. FITZPATRICK.

Witnesses:
  B. F. RICHARDS,
  FRANCIS J. TOMASSON.